Patented July 12, 1932

1,867,063

UNITED STATES PATENT OFFICE

CHARLES C. DAWE, OF DENVER, COLORADO

ANIMAL FEED

No Drawing.   Application filed November 27, 1931. Serial No. 577,698.

My invention relates to feed and particularly to a wet mash poultry and/or live stock feed. An important object of the invention is to provide a feed in which the ingredients are held in suspension in a liquid.

Another object is to provide such a feed in which ingredients such as grains and the like are maintained in a uniform distribution through the mass.

It is well known that a fowl will not go through water to get food, where the food has settled to the bottom of the water to a depth greater than the distance from the end of the fowl's beak to its air passages. For this reason a great deal of heavier food particles settle to the bottom of a quantity of liquid and are lost since the fowls will not reach for them. An object of my invention is to prevent the heavier food particles from settling.

With live stock, such as hogs, when the wet mash food is poured into a trough, the heavier food particles quickly settle and tend to remain at the end of the trough where the feed is poured in. Thus the hogs at said end get most of the food value from the mash and the hogs at the other end of the trough get mostly liquid.

A further object is to carry out the present invention without the use of either warm or hot water. It is of advantage to feed wet mash to stock and poultry since the grain and other particles of food are softened by the moisture and thus partly pre-digested. Feed that is to some extent predigested is more valuable as a fattening or finishing feed to bring the poultry or stock to a good marketable condition.

Thus an object of my invention is to create a wet mash feed in which the grain and other heavier particles will be held uniformly in suspension. Other objects will be seen in the course of the following detailed description of my invention.

To carry out the foregoing objects, I add to the feed a small percentage of a colloidal or a jelly-forming material, preferably an inorganic substance such as bentonite, or some other material having these properties.

More specifically, I add bentonite to a dry feed in about the proportions of bentonite 10% to dry feed 90%. A greater proportion of dry feed may be used if desired. The bentonite is preferably in powder form when mixed with the dry feed. The dry feed is preferably a balanced ration that is adaptable for nourishing and/or fattening poultry or stock, and may include cereals, etc.

The mixed bentonite and dry feed is then added to about three (3) or four (4) times its weight in water. Agitation is advisable to get a thorough mixture.

The bentonite having relatively great absorptive properties forms with the water a colloidal, jelly-like mass, which is capable of supporting the heavier food particles in suspension uniformly through the mass.

Where it is desired to increase the absorptive properties of the bentonite, whereby either considerably more water can be used than with straight bentonite, or where it is desired to use less bentonite, a small amount of magnesium oxide (about 2% of the amount of bentonite) may be added to the bentonite. Other substances having about the same alkalinity as magnesium oxide may be substituted therefor. It is preferred to add the magnesium oxide to the bentonite when the latter is dry. By the addition of the magnesium oxide, the bentonite will form a jelly-like mass in twenty (20) to thirty (30) times its weight of water.

It is to be understood that changes may be made in the details of the proportions and in other details of the invention without departing from the spirit and scope of the invention.

What I claim and desire to secure by Letters Patent is:

1. A wet poultry or stock feed containing particles adapted to settle, and containing bentonite holding said particles in suspension.

2. A poultry or stock feed containing water, food particles adapted to settle in the water, and bentonite holding the food particles in suspension in the mass.

3. A feed according to claim 2 in which the bentonite is mixed with at least nine (9) times its weight of dry feed and the bentonite and feed are mixed with at least three (3) times their weight of water.

4. A feed according to claim 2 in which the bentonite is mixed with a relatively small amount of magnesium oxide.

5. A feed according to claim 2 in which the bentonite is mixed with about two per cent (2%) of its weight of magnesium oxide.

6. A poultry or stock feed, containing food material having a different specific gravity than water, and bentonite effective when an aqueous medium is added, forming a wet feed, to hold the food material in suspension within the mass.

7. A poultry or stock feed containing water, food material having a different specific gravity than water, and bentonite holding the food material in suspension within the mass.

In testimony whereof I hereunto affix my signature.

CHARLES C. DAWE.